United States Patent [19]

Wanlass

[11] 3,881,175

[45] Apr. 29, 1975

[54] INTEGRATED CIRCUIT SOS MEMORY SUBSYSTEM AND METHOD OF MAKING SAME

[75] Inventor: Frank M. Wanlass, Cupertino, Calif.

[73] Assignee: LSI Systems Incorporated, Sunnyvale, Calif.

[22] Filed: Dec. 26, 1973

[21] Appl. No.: 428,087

[52] U.S. Cl. ........ 340/173 SP; 340/173 R; 307/238

[51] Int. Cl. ........ G11c 11/40

[58] Field of Search ........ 340/173 R, 173 SP; 307/238

[56] References Cited

UNITED STATES PATENTS

| | | | |
|---|---|---|---|
| 3,529,299 | 9/1970 | Chung | 340/173 SP |
| 3,584,183 | 6/1971 | Chiaretta | 340/173 SP |

*Primary Examiner*—Terrell W. Fears

*Attorney, Agent, or Firm*—Schatzel & Hamrick

[57] ABSTRACT

An integrated circuit silicon-on-sapphire memory subsystem and the method of making same is disclosed. The subsystem comprises an insulating sapphire substrate, an array of memory circuits disposed on one surface of the substrate, a bus system disposed on the substrate for carrying electrical signals and power from a power source to selected ones of the memory circuits, and a plurality of fuses, each fuse comprised of a semiconductive material and interconnecting the bus system to a selected memory circuit. In order to determine which of the array of memory circuits are selected to be part of the memory subsystem, the operability of the memory circuits is tested. If a memory circuit is found unacceptable, the fuse connecting it to the bus system is blown so as to electrically isolate that memory circuit from the acceptable memory circuits.

7 Claims, 3 Drawing Figures

INTEGRATED CIRCUIT SOS MEMORY SUBSYSTEM AND METHOD OF MAKING SAME

BACKGROUND OF THE INVENTION

1. Field of the Invention

This invention relates to silicon-on-sapphire devices and, more particularly, to silicon-on-sapphire memory subsystems and methods of making same.

2. Description of the Prior Art

Silicon-on-sapphire structures, which have been abbreviated in the art as SOS, have been known to the art for about 10 years. However, up until a few years ago, the quality of such structures has been unsatisfactory for processing the structures into reliable semiconductor devices. Accordingly, the thrust of the semiconductor industry has been to develop improved metal-oxide-semiconductor (MOS) transistors for use as basic elements in large-scale digital arrays.

However, MOS arrays have been disadvantageously characterized by relatively slow operating speeds because of harmful parasitic capacitance between the doped regions of the semiconductor body and the surrounding body material itself. In addition, load resistors fabricated in MOS technology exhibit resistances that are commensurate with their physical size. Consequently, much expensive real estate is required to provide large resistances.

In order to overcome these problems encountered in MOS technology, devices have been constructed in SOS technology that achieve high-speed performance, dissipate very little power and are much smaller than MOS devices. Examples of such devices are found in copending U.S. patent applications, Ser. No. 426,003, filed Dec. 19, 1973, entitled "Self-Aligned SOS Structure Including Fabrication Method Therefor," and Ser. No. 426,015, filed Dec. 19, 1973, entitled "Compact SOS Integrated Circuit Resistor and Circuits Employing Same, and Fabrication Methods Therefor," by Frank M. Wanlass. The transistors and resistors taught in those applications can be combined into minute memory circuits for storing digital information.

In a prior art process for making packaged integrated circuits, arrays of integrated circuit memory circuits are fabricated on a wafer. Thereafter the electrical characteristics of each of the circuits are tested and compared to an acceptability reference. The circuits found to be acceptable are then marked. The wafer is then diced, by scribing, into individual circuits and the bad circuits are discarded. The acceptable circuits are thereafter bonded into an IC package.

The process described has many disadvantages. One disadvantage in the prior art process is that it is very expensive since it requires many bonding operations. For example, in fabricating a memory module from 100 chips, 4000 bonds are required since each chip has 20 bonding pads and each interconnecting conductor must be bonded to pads at both of its ends. Another substantial expense is attributed to the scribing operation in which the individual circuits are scribed from the wafer. In addition to the labor cost, it should be noted that in practice many good memory circuits are ruined during scribing. Another disadvantage is that many packaged circuits do not meet specifications and thus are scrapped. This factor is due, in part, to the difficulty in performing the numerous bonding operations since, in general, bonding operations are performed by an operator under a microscope with a delicate bonding machine.

To avoid the scribing operations and decrease the number of bonds required, several attempts have been made to provide memory subsystems without separating the memory circuits from the wafer. These attempts have been directed to techniques for interconnecting acceptable memory circuits on a wafer with a custom metal mask. However, since upward of 400 memory circuits are commonly included on a wafer, these attempts have been commercially unsuccessful.

SUMMARY OF THE INVENTION

This invention provides an integrated circuit SOS memory and the method of making the memory wherein discretionary wiring techniques interconnect only the good memory circuits on a sapphire substrate.

It is an object of this invention to provide a very reliable method for fabricating memory subsystems that is relatively inexpensive.

It is another object of this invention to provide a high-speed, high-density memory subsystem.

Still another object of this invention is to provide a compact memory system with decreased bonding requirements and which lends itself to automated fabrication.

In accordance with this invention, an integrated circuit SOS memory subsystem is disclosed. The memory subsystem comprises an insulating sapphire substrate, an array of memory circuits disposed on one surface of the substrate, a bus system disposed over the substrate for carrying electrical signals and power, and a plurality of fuses for selectively electrically interconnecting the bus system to one of a predetermined number of the memory circuits. The predetermined number is less than the number of memory circuits in the array. The fuses are comprised of a semiconductive material.

In accordance with another embodiment of this invention, a method of making an integrated circuit SOS memory subsystem on a sapphire substrate is disclosed. The method comprises the steps of forming an array of SOS memory circuits on the substrate, forming a bus system on the substrate to provide a conducting path for electrical signals and power, forming fuse links from each circuit to interconnect to the bus system, selectively supplying electrical energy to a circuit, measuring an output signal produced by the circuit in response to the supplied energy so as to determine if the circuit is electrically acceptable, and electrically energizing the fuse links between the circuit and the bus system so as to blow the fuse when the measured signal is such that the circuit is not electrically acceptable, thus removing that memory circuit from the remaining circuits in the array.

The primary advantage of this invention is its relatively low cost in view of the reduced number of bonds required.

Another advantage of this invention is the increased reliability resulting from the reduced number of bonds required.

Still another advantage of this invention is that a compact, high-density memory system is formed on a single sapphire substrate.

Yet another advantage of this invention is that it provides a simple method of making SOS memory systems. With this process it takes only a short time longer to test and to discretionarily wire a sapphire substrate into a memory subsystem than was taken to merely test a wafer in accordance with the prior art process.

Other objects and advantages will be apparent to those skilled in the art after having read the following detailed disclosure which makes reference to the several figures of the drawings.

IN THE DRAWING

DESCRIPTION OF THE PREFERRED EMBODIMENTS OF THIS INVENTION

Figure 1:
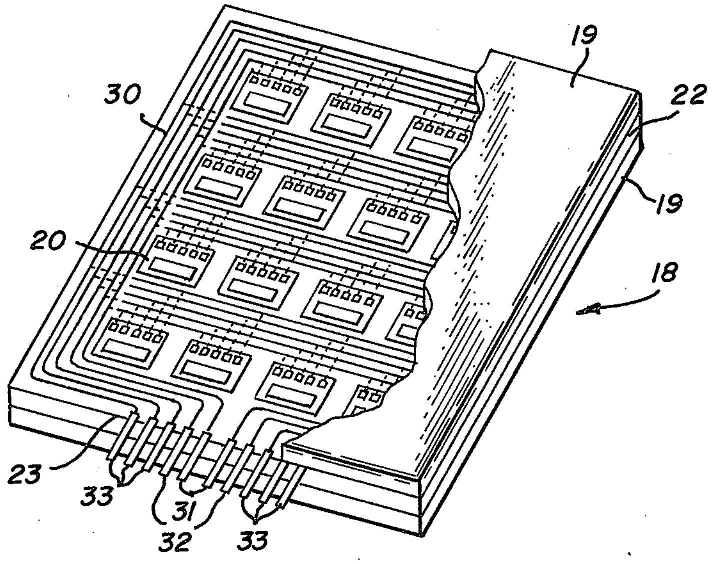
FIG. 1 is a perspective view of the memory subsystem of this invention with a portion of the top protective coating broken away for clarity.

Referring now to FIG. 1, an integrated circuit SOS memory subsystem is illustrated in a perspective view. The subsystem comprises a wafer 18 that includes an array of memory circuits 20 fabricated on a common sapphire insulating substrate 22. A bus system, generally designated by the numeral 30, provides a conductive path for electrical signals and a power distribution network to the memory circuits 20. Fuses 35 interconnect selected ones of the memory circuits 20 to the bus system 30.

The process used to form the several elements which comprise the memory subsystem is similar to the SOS process described in the previously recited "Self-Aligned SOS Structure Including Fabrication Method Therefor" and "Compact SOS Integrated Circuit Resistor and Circuits Employing Same, and Fabrication Methods Therefor." Briefly, the process requires four masks. The first mask defines where impurities are to be formed in the single layer of silicon that is formed on the sapphire substrate. The second mask selectively isolates the silicon into islands. The third mask or contact mask defines where interconnections will be made between the silicon and an overlying aluminum metal layer. The fourth mask defines the pattern of the metal. It should be noted that this specification involves a different metal pattern than the ones taught in the recited applications. The particular details of the process have been omitted from this specification since these are similar to those described in the recited copending applications. Those patent applications are incorporated by reference to this specification for any details not disclosed herein.

The insulating substrate 22 is used as the starting structure for the fabrication of the SOS memory subsystem of this invention. Preferably, the substrate 22 is a pure aluminum oxide structure that is shiny, colorless and transparent in appearance and which is nicknamed "sapphire" because of these characteristics. The sapphire in side elevational view is 12 to 15 mils in thickness.

The wafer 18 is 2 inches square and has a thickness of 0.05 inches. For convenience the wafer is illustrated as comprising only a four row, four column array of memory circuits. Preferably the array is a 20 row, 20 column matrix, although the number of matrix elements can vary as is easily recognized by one skilled in the art. In the 20 by 20 array, 400 memory circuits are provided. It has been found that yields of at least 25 percent can be obtained with SOS processing techniques. Accordingly, after testing the individual memory circuits the wafer will comprise more than 100 acceptable memory circuits. Thereafter, 100 of the acceptable circuits are selectively interconnected to form a sapphire memory subsystem. If yields of less than 25 percent are realized then the substrate can be made larger. For example, a 3-inch by 3-inch substrate containing 900 potential memory circuits can be used.

Figure 2:
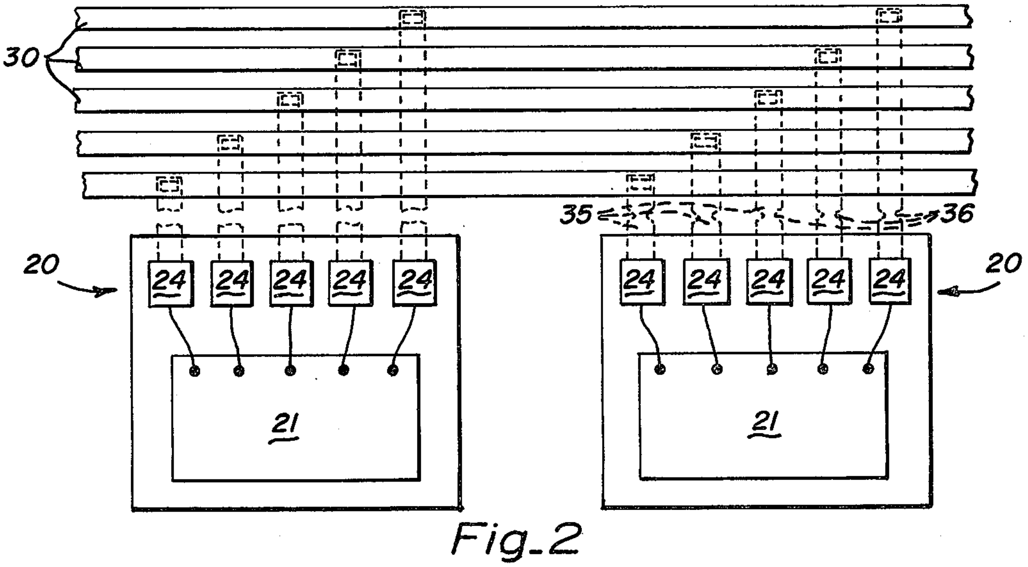
FIG. 2 is a plan view of a portion of the memory subsystem of claim 1 illustrating two memory circuits, one of which is connected to the bus system and the other of which is removed from the array.

Referring now to FIG. 2, two adjacent memory circuits are illustrated. The memory circuits 20 comprise SOS memory elements 21 formed by selectively interconnecting field effect transistors (FET), diodes, resistors and other integrated circuit components in flip-flop circuits, NOR gates and other circuits used to store and process digital information. Preferably, the elements are arranged to provide a single 1024 bit memory circuit and have input and output terminals that are compatible with TTL logic levels. The circuits are preferably fabricated in SOS technology from the devices described in the previously recited copending patent applications entitled "Self-Aligned SOS Structure Including Fabrication Method Therefor" and "Compact SOS Integrated Circuit Resistor and Circuits Employing Same, and Fabrication Methods Therefor." Each circuit is substantially square in plan view, being 100 mils on a side.

The circuit 20 includes a pattern of conductive test pads 24 that are connected to the memory elements and arranged around the outer perimeter of the circuit. Although only five test pads are illustrated it should be recognized that the number of test pads is dependent upon many factors relating to the memory system including, for example, the power requirements for the system, the number of command signals, and the number of conductors in the bus system. However, once the number of test pads is chosen to satisfy the maximum requirement, the test pads are arranged in the same pattern on each memory circuit. Accordingly, testing of the memory circuits will be facilitated and uniform as will be subsequently described.

The bus system 30 comprises metal conductors that provide a distribution network for bringing the power and the signals to each of the memory circuits 20. The conductors, as shown, includes a first set comprising two ground conductors 31, two power conductors 32 and six signal conductors 33. The conductors are disposed over the top surface of the sapphire substrate and are arranged in a finger-like pattern that commences in a plane defined by one edge 23 of the substrate. Five conductors fan out in opposite directions from the edge 23 and extend along the sides of the wafer normal to edge 23, outside the outermost columns of memory circuits. The conductors 31, 32 and 33 are spaced-apart and parallel to one another. A second set of conductors is disposed in groups between each row of memory circuits and along the top edge of the wafer, opposite the edge 23, substantially perpendicular to the first set. In length the second set of conductors extends between the outside bus conductors. Thus, the conductors of the second set pass close to each internal individual memory circuit within the array. The conductors of the bus system are coplanar and formed from the fourth mask by photo-etching in the same space that is normally, in the prior art process, wasted for scribing.

The terms "left" and "right" and "top" and "bottom" and words of similar import as used in this specification are intended to apply only to the position of the surfaces as illustrated in the drawings, since it is well known that the surfaces may be oriented in many different positions.

One of the features of this invention are the fuse links that interconnect the test pads to one of the conductors. The fuses 35 or tunnels are bodies comprised of a semiconductive material that are formed on the top surface of the sapphire substrate during the same deposition step in the SOS process as the semiconductor portions of the memory elements. In particular, P-type silicon is deposited on the sapphire substrate and doped to provide fuse links 35 that have an N+ conductivity. Accordingly, the fuses 35 are part of a layer that passes below the layer of the conductors. Electrically insulating layers between the silicon fuses and the conductors prevent inadvertent short circuits from occurring. At each electrical interconnection of one of the fuses with a conductor the insulating layers are removed by etching away prior to the formation of the conductors. Thus, when the conductors are formed, a conductive path is provided between the semiconductor fuse and the conductor. Preferably, the semiconductive material comprising the fuse links is silicon having an N+ conductivity and a resistivity of approximately 10 ohms per square. A square is defined when the ratio of length to width in plan view is equal to unity. Accordingly, if the length of a fuse is five times greater than its width it has a resistance of 50 ohms per unit thickness.

In the preferred embodiment, the fuses that interconnect the test pads to the conductors have resistances between 10 and 100 ohms. This shunting resistance of the fuse links is relatively appreciable. It should be recognized that the resistivity of silicon is much greater than aluminum which is approximately 0.02 ohms per square. It is because of this difference that electrical tests of the memory circuits can be made since the fuse resistance is effectively in parallel with the memory elements during acceptability tests. For example, if the fuses were aluminum, a short circuit path would exist from the test pad through the conducting bus. This short circuit would preclude meaningful responses from the output voltages of the memory circuit from being achieved. In addition to the resistivity property, the fuses interconnecting the test pads and the conductors preferably have a constricted or notched region 36. It is this constricted region which will blow when a voltage is impressed across the ends or terminals of the fuse in view of the high current density it is subjected to.

The silicon fuse links also serve another purpose. The fuses that interconnect the "column" conductors to the "row" conductors act as cross-under tunnels carrying signals from one "column" wire in the bus under the other wires, and into the "row" conductor for subsequent interconnection to a memory circuit. It is very convenient that the fuse links are covered with oxide from the SOS processing, so that the metal bus system is not automatically shorted to these semiconductor cross-unders. However, if a few pinholes arise causing interbus shorts, the associated fuse links are easily burned out in accordance with this invention. The ease of burning open shorts provides a fundamental yield advantage for SOS technology, when applied to discretionary manufacturing of memory subsystems. As a contrast in monolithic technology, if there were a pinhole short between a metal bus line and the semiconductor substrate, it would be very difficult to burn out the shorted portion without destroying the bus system.

Figure 3:
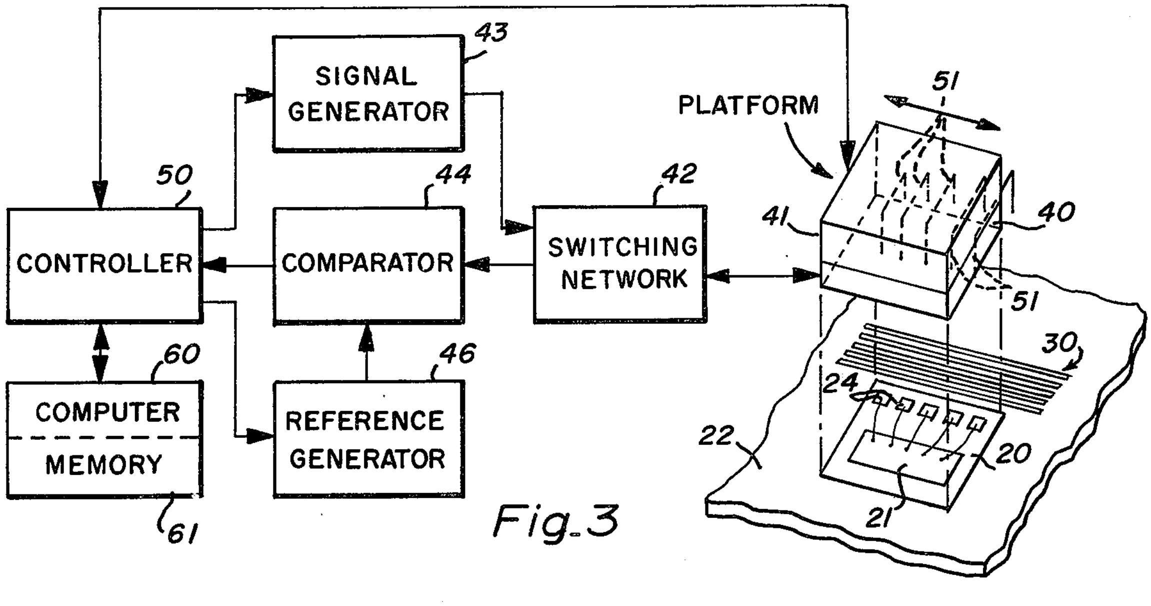
FIG. 3 is a block diagram of a system for testing the individual memory circuits shown in reference to a portion of the memory subsystem of this invention.

Referring now to FIG. 3, a machine for testing and selectively removing unacceptable memory circuits from the array is shown in block diagram form. The machine is designated as an automatic wafer probe machine and comprises a probe head 40, a platform 41 for carrying the probe head, a switching network 42, a signal generator 43, a comparator 44, a reference signal generator 46 and a controller 50. A computer 60 having a memory 61 is programmed to automate the testing process. The memory 61 stores information relative to the acceptability tests.

The probe head 40 includes a plurality of conductive pins 51 depending downwardly therefrom. There are five pins which are arranged to mate with the five test pads 24 of each memory circuit when the probe head is positioned over one of the memory circuits. The signal generator 43 is connected through the switching network 42 to the probe head 40 and provides appropriate electrical test signals to the pins 51. The switching network 42 allows signals to be simultaneously or sequentially applied into and out of the selected pins 51 on the probe head. The comparator 44 is electrically connected to the output conductor of the reference signal generator 46. Accordingly, the output signal from the memory circuits applied to one of the pins 51 in response to the test signal is applied to the comparator 44 and compared with a reference signal from the reference signal generator 46. The controller 50 under the control of computer 60 moves the platform 41 so as to position the pins of the probe head into an electrically contacting relationship with the test pads 24 of one of the memory circuits 20 and supplies an indication of the acceptable output test signal to the reference generator 46, which in turn, develops the electrical reference signal.

In operation, the probe head is positioned over one of the memory circuits by the controller 50. The controller 50 then provides an indication to the signal generator 43 that the probe head is in position. The signal generator 43 thereafter supplies an electrical test signal to the test pads 24 of the memory circuit 20. The response to the test signal is then sensed and compared with the reference signal generated by reference generator 46 in comparator 44. If the output signal from the memory circuit under test exceeds the reference signal, the circuit is considered to be electrically acceptable. If, however, the output signal is below the reference signal, indicating that the tested memory circuit is electrically unacceptable, the controller 50 provides an appropriate control signal to the generator 43 indicative of unacceptability of the circuit under test. Accordingly, generator 43 applies a high voltage signal across the terminals of each of the fuse links of the unacceptable memory circuit. The high voltage signal is selected as being sufficient to cause each of the fuses to melt or blow. Consequently, the unacceptable memory circuit is electrically removed from the array. Then the controller indexes the probe head over the next memory circuit for a similar test. Referring to FIG. 2 again, the memory circuit on the left is shown with its fuse leads blown and thus removed from the array.

In the preferred embodiment test voltages of approximately 2 volts are applied to the test pads for approximately 1 millisecond. These test voltages are insufficient to damage the fuse links. On the other hand voltages of about 10 volts applied across the fuse terminals for about 1 second have been adequate to melt the fuse link at the constricted region. It should be recognized that both voltages and times are dependent upon the fuse dimensions and material.

The number and location of the electrically acceptable memory circuits are stored in the memory 61 of the computer 60. After 100 circuits are determined to be acceptable, the remaining circuits are then indexed with the probe head and their fuses blown.

Finally, the top and bottom surfaces of the substrate are selectively coated with a protective material 19, such as a plastic, to strengthen and improve durability of the memory subsystem. Because the leads all terminate at one edge of the substrate the memory subsystem is easily plugged into a standard printed circuit board socket (not shown). Accordingly, a process has been described for inexpensively making an SOS memory subsystem and which takes about the same time as did the testing procedures of the prior art.

In an alternative embodiment, after the memory circuits on the wafer are probed and tested, a blob of ink is deposited on the unacceptable ones. Thereafter, a separate probe head applies a high voltage to the test pads of the unacceptable memory circuits to blow the interconnecting fuses.

It should be noted that on some wafers the bus system may comprise 15 signal leads and five power leads, and there may be 20 test pads. Accordingly, the probe head would comprise 20 pins.

From the above, it will be seen that there has been provided an SOS memory subsystem and method of making same which fulfills all of the objects and advantages set forth above.

While there has been described what is at present considered to be the preferred embodiment of the invention, it will be understood that various modifications may be made therein, and it is intended to cover in the appended claims all such modifications that fall within the true spirit and scope of the invention.

What is claimed is:

1. An integrated circuit SOS memory subsystem comprising:

an insulating sapphire substrate;

an array of memory circuits disposed on one surface of said substrate;

a bus system disposed over said substrate; and a plurality of fuses for selectively electrically interconnecting said bus system to one of a predetermined number of said memory circuits in said array, wherein each of said fuses is comprised of a semiconductive material.

2. An integrated circuit SOS memory subsystem as recited in claim 1 wherein said bus system comprises a plurality of conductive buses and wherein each said memory circuit includes a plurality of conductive test pads, one of said fuses interconnecting one of said buses to one of said test pads for each of said predetermined number of memory circuits.

3. An integrated circuit SOS memory subsystem as recited in claim 1 wherein each fuse has a resistance of between 10 and 100 ohms per square.

4. An integrated circuit SOS memory subsystem as recited in claim 1 and further including means coating the exposed surfaces of said substrate for protecting said memory subsystem.

5. An integrated circuit SOS memory subsystem as recited in claim 2 wherein said plurality of conductive buses includes a first set of buses, each bus of said first set being spaced-apart from and parallel to adjacent buses, said first set extending outside the outermost column of said array, and terminals for said buses lying in a plane along one edge of said substrate for connecting to a printed circuit socket.

6. An integrated circuit SOS memory subsystem as recited in claim 5 wherein said plurality of conductive buses includes a second set of buses that are coplanar with and extend substantially perpendicular to said first set, and further including fuses for interconnecting a bus of said first set to a bus of said second set.

7. An integrated circuit SOS memory subsystem as recited in claim 6 wherein said fuses are disposed on said one surface of said substrate and are beneath the plane of said bus system.

* * * * *